(12) United States Patent
Griffiths et al.

(10) Patent No.: US 8,428,420 B2
(45) Date of Patent: Apr. 23, 2013

(54) ASSEMBLY FOR INSTALLING AN OPTICAL ACCESS NETWORK

(75) Inventors: Ian Griffiths, Milan (IT); Arnaud Le Dissez, Milan (IT)

(73) Assignee: Prysmian S.p.A., Milan (IT)

( * ) Notice: Subject to any disclaimer, the term of this patent is extended or adjusted under 35 U.S.C. 154(b) by 84 days.

(21) Appl. No.: 13/061,173

(22) PCT Filed: Sep. 1, 2008

(86) PCT No.: PCT/EP2008/061509
§ 371 (c)(1),
(2), (4) Date: Jun. 24, 2011

(87) PCT Pub. No.: WO2010/022798
PCT Pub. Date: Mar. 4, 2010

(65) Prior Publication Data
US 2011/0249949 A1    Oct. 13, 2011

(51) Int. Cl.
G02B 6/00 (2006.01)
(52) U.S. Cl.
USPC .......................................... 385/135
(58) Field of Classification Search .................. 385/135
See application file for complete search history.

(56) References Cited

U.S. PATENT DOCUMENTS 6,362,420 B1    3/2002 Bacouelle et al.
2012/0293391 A1*  11/2012 Simmons et al. ............. 343/859
2012/0295486 A1*  11/2012 Petersen et al. ............. 439/658

FOREIGN PATENT DOCUMENTS

| EP | 692898 A1 * | 1/1996 |
| JP | 7-181354 | 7/1995 |
| JP | 10-336846 | 12/1998 |
| WO | WO 2009030277 A1 * | 3/2009 |

OTHER PUBLICATIONS

International Search Report from the European Patent Office for International Application No. PCT/EP2008/061509 (Mail date: May 18, 2009).

* cited by examiner

Primary Examiner — Sarah Hahm
(74) Attorney, Agent, or Firm — Finnegan, Henderson, Farabow, Garrett & Dunner, L.L.P.

(57) ABSTRACT

An assembly for installing an optical access network includes at least one in-line optical cable and a drop cable. The assembly includes a duct suitable for housing the at least one in-line optical cable and an optical transition box for snaking an optical connection between the at least one in-line optical cable and the drop cable. The duct has a window. The optical transition box has a base with two sidewalls. Each of the two sidewalls has a first opening allowing the in-line optical cable to enter and exit the base. The base is suitable for being partially inserted in the duct through the window in such a way that, when the base is partially inserted in the duct, the first opening is contained within the duct.

14 Claims, 8 Drawing Sheets

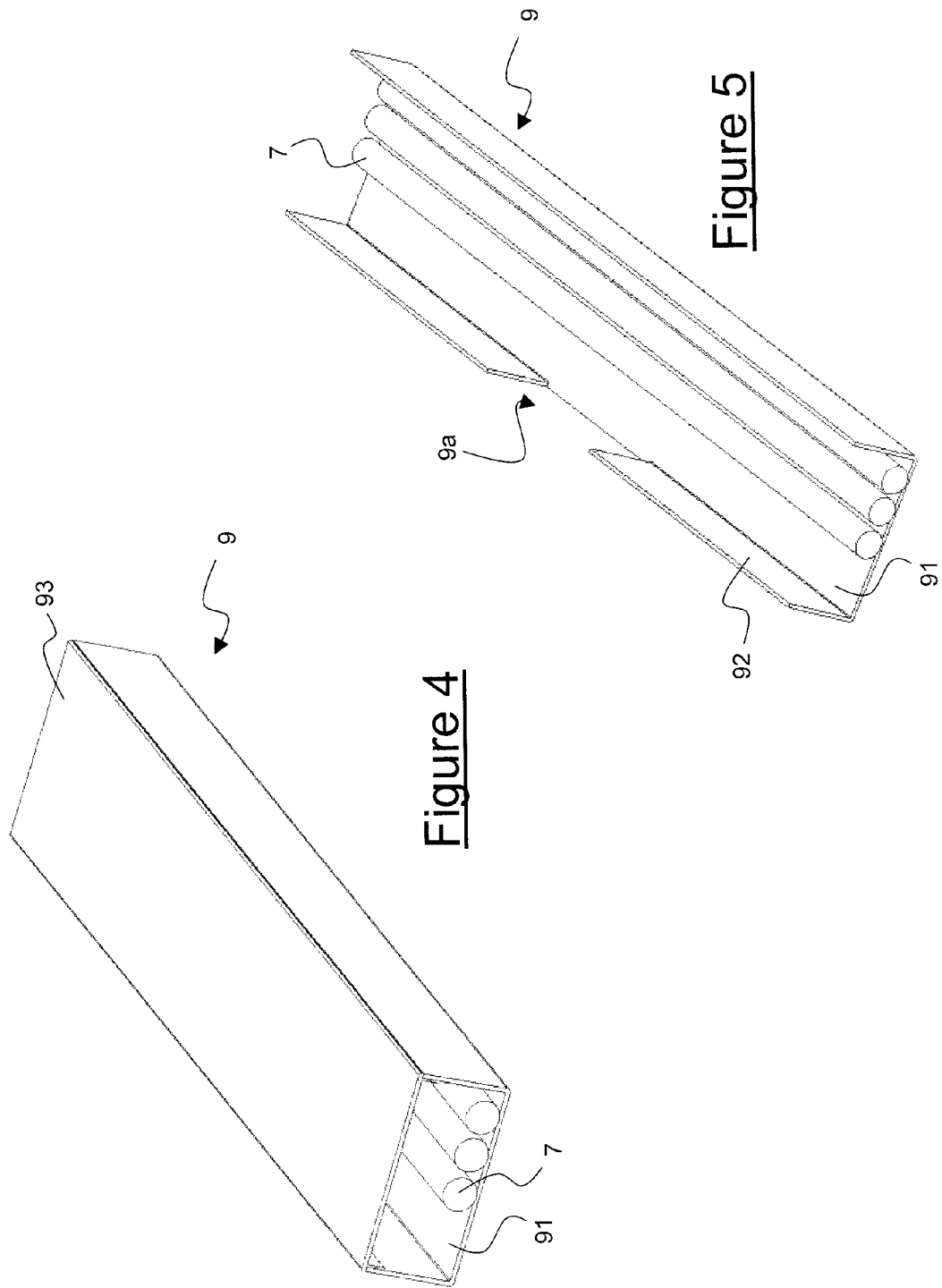

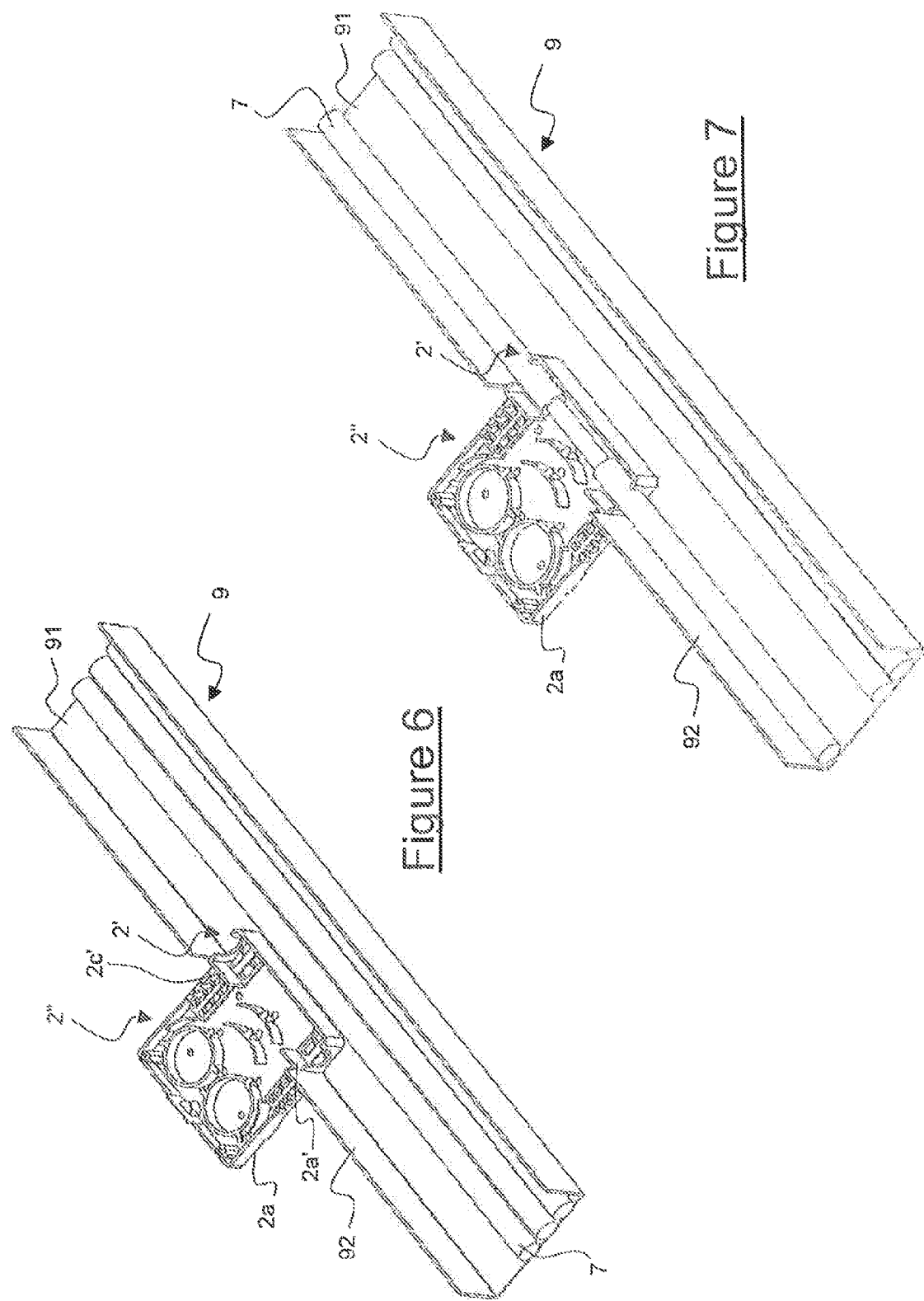

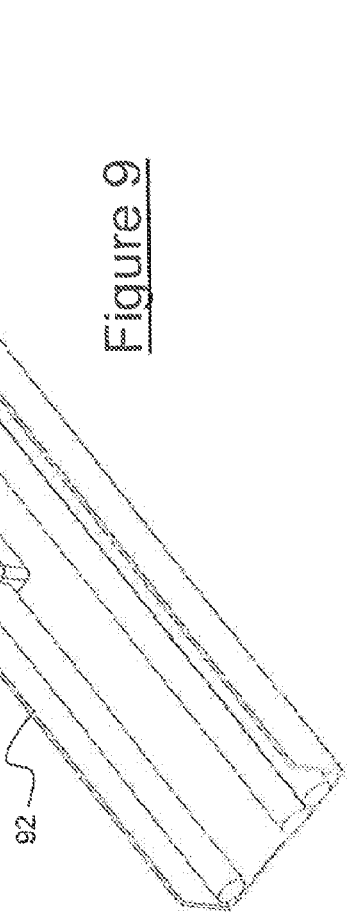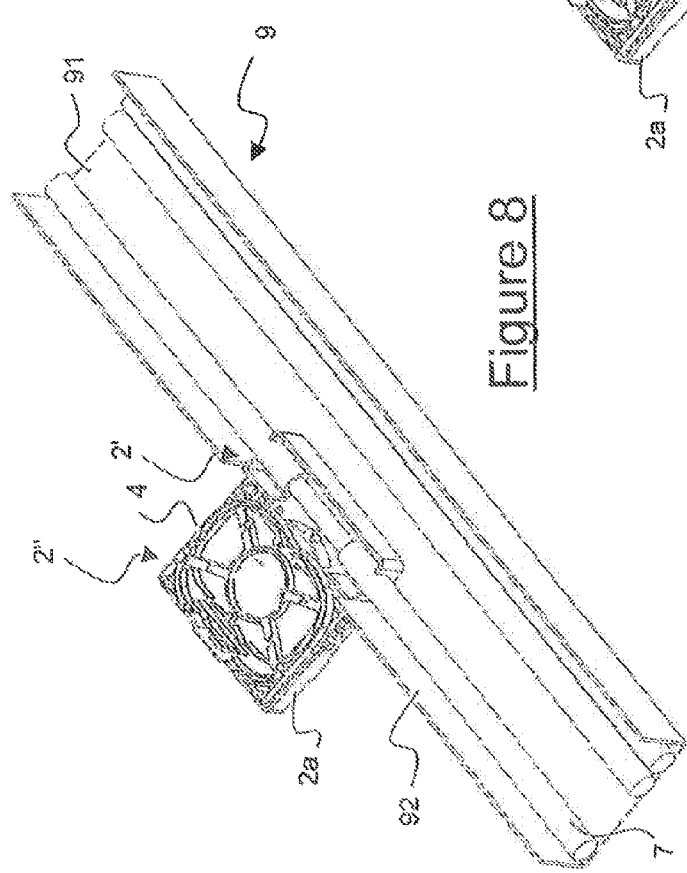

ical fibers.

ASSEMBLY FOR INSTALLING AN OPTICAL ACCESS NETWORK

CROSS REFERENCE TO RELATED APPLICATION

This application is a national phase application based on PCT/EP2008/061509, filed Sep. 1, 2008, the content of which is incorporated herein by reference.

TECHNICAL FIELD

The present invention relates to the field of optical access networks. In particular, the present invention relates to an assembly for installing an optical access network, the assembly including a duct suitable for housing at least one in-line optical cable and an optical transition box for making an optical connection between the at least one in-line optical cable and a drop cable. Furthermore, the present invention relates to a method for installing an optical access network.

BACKGROUND ART

A FTTH network is an optical access network providing a number of end users with communication services, e.g. with services requiring data transmission at a rate of some hundreds of Mbit/s or more.

Typically, a FTTH network comprises a distribution cabinet cooperating with a transport network. The distribution cabinet is often located in the basement of the building where the end users reside and is connected with termination boxes arranged, for example, at the various building floors via optical cables, housing one or more optical fibers.

An optical cable comprising a plurality of optical fibers typically exits the distribution cabinet. In the following of the present description, an optical cable which exits a distribution cabinet and serves each floor of a given building to reach each end user will be indicated as "in-line optical cable". Further, in the following of the present description, each optical fiber of an in-line optical cable will be indicated as "in-line optical fiber".

Typically, the in-line optical cable vertically runs through the building from the basement up to all the building floors. The in-line optical cable is typically laid down within a duct, which is substantially vertically fixed to a building wall and which mechanically protects the in-line optical cable.

In the following of the present description, the duct which receives an in-line optical cable will be indicated as "in-line cable duct".

Typically, an optical cable comprising comprises one or more optical fibers, generally two, branches out the in-line optical cable and exit the termination box for connecting the end user at a certain floor. In the following of the present description, said optical cable branching out the in-line optical cable will be indicated as "drop cable". Further, in the following of the present description, each optical fiber of a drop cable will be indicated as "drop optical fiber".

Connecting the distribution cabinet to a termination box requires extracting at least one in-line optical fiber from the in-line optical cable and connecting, typically by splicing, such an in-line optical fiber to a drop optical fiber of said drop cable exiting the termination box. The optical connection between the in-line optical cable and the drop cable is typically made in a so-called "optical transition box".

An optical transition box typically comprises a base and a cover. The base has a bottom and, typically, four sidewalls. One of the sidewalls has a number of holes (usually up to 12 holes) each shaped for allowing the free end of a respective drop cable to be inserted into the optical transition box. Typically, the base of the optical transition box is provided with a plurality of tracks for properly arranging the optical fibers therein. Generally, each track is provided with straight portions and curved portions, each curved portion having a bending radius of at least 20 mm in order to minimize the bending losses of the arranged optical fibers. The base of the optical transition box is also provided with an area suitable for housing the joints (i.e. fusion splices and/or mechanical joints) between optical fibers.

Optical transition boxes are typically configured to be associated to the in-line cable duct so that a portion of the in-line cable duct is housed within the box. To this purpose, two opposite sidewalls of the box have respective recesses for housing an in-line cable duct so that a portion of the in-line cable duct is contained in the optical transition box.

Accordingly, installation of an optical transition box firstly requires fixing the bottom of the optical transition box base to a wall of the building so that the recesses of the two opposite sidewalls are substantially vertically aligned. Then, the in-line cable duct is usually vertically oriented and inserted in the recesses so that a portion thereof is contained within the box. The portions of the in-line cable duct entering and exiting the box are fixed to the building wall as well. A window is made in the portion of the in-line cable duct which is contained in the optical transition box so that the in-line cable is exposed and the outer sheath thereof can be peeled off for accessing the in-line optical fibers.

The free end of each drop cable connected to a respective termination box is inserted in a respective hole of a sidewall of the optical transition box base so that a portion of the drop cable is received in the box and the outer sheath of the drop cable can be peeled off for some tens of centimeters (starting from the free end thereof) for allowing the respective drop optical fiber(s) to be exposed.

At least one in-line optical fiber is connected to a respective drop optical fiber by means of fusion splicing or a mechanical joint.

The in-line optical fibers and drop optical fibers are then arranged in the tracks provided in the box base and the splices/mechanical joints are arranged in the dedicated area of the box base.

Finally, the cover is positioned onto the box base so that the optical transition box results to be safely closed.

SUMMARY OF THE INVENTION

The Applicant has noticed that the above known solution for installing an optical access network has some problems.

In particular, the Applicant has noticed that, disadvantageously, according to the above solution the optical transition boxes should be positioned and fixed to the wall before the duct is installed. Indeed, in case the duct with the in-line cable is already fixed to the wall, the installation of the optical transition box disadvantageously requires moving the duct away from the wall for inserting the base of the optical transition box between the wall and the duct. This implies that the operation of expanding an already installed optical access network, e.g. by connecting to it one or more new termination boxes requiring the installation of one or more new optical transition boxes, is undesirably complex.

Moreover, optical transition boxes designed to house portions of in-line cable ducts have the overall dimensions remarkably high. In particular, the Applicant has noticed that such optical transition boxes considerably protrude from the building wall (much more than the in-line cable ducts to which they are associated), thereby negatively affecting the cable installation from an aesthetical point of view. Moreover, the width of such boxes is disadvantageously very high, since their base must house the duct and, next to the duct, it must provide an area for arranging optical fibers and joints.

The Applicant has tackled the problem of providing an assembly for installing an optical access network, the assembly including a duct suitable for housing at least one in-line optical cable and an optical transition box for making an optical connection between the at least one in-line optical cable and a drop cable, which overcomes the drawbacks mentioned above.

In particular, the Applicant has tackled the problem of providing an assembly for installing an optical access network, the assembly including a duct suitable for housing at least one in-line optical cable and an optical transition box for making an optical connection between the at least one in-line optical cable and a drop cable, wherein the operation of installing new optical transition boxes when the duct is already fixed to the wall is simpler than according to the above known solution.

The Applicant has perceived that this problem can be solved by providing an assembly comprising an optical transition box and a duct in which the optical transition box is suitable for being partially inserted into the duct through a window in the duct in such a way that, when the box is partially inserted in the duct, the in-line optical cable can enter and exit the optical transition box via relevant openings in the optical transition box.

In this way, when an in-line cable laid down in a duct fixed to a wall has to be optically connected to a drop cable, a window is opened on a side of the duct, the base of the optical transition box is positioned so that it is partially inserted in the duct with the openings contained within the duct, and a portion of the in-line cable is introduced in the optical transition box by means of the openings provided in the sidewalls thereof. Then, an end of a drop optical cable is also introduced in the optical transition box, thus allowing making an optical connection between one of the in-line fibers of the in-line optical cable and the drop fiber of the drop optical cable within the box.

Therefore, advantageously, the operation of installing a new optical transition box when the duct is already fixed to the wall is simpler than according to the above known solution, since it does not require to move the duct away from the wall, but it only requires to open a window on a side of the duct, which is a very simple operation.

Moreover, the optical transition box of the assembly has a much reduced thickness. Indeed, while the known optical transition boxes should be thicker than the in-line cable duct (since the latter has to be contained within the optical transition box), the optical transition box of the assembly according to the present invention is less thin than the in-line cable duct, since it has to be partially contained within the duct. Besides, also the width of the optical transition box is reduced. This advantageously results in an optical installation of reduced size and aesthetically effective.

According to a first aspect, the present invention provides an assembly for installing an optical access network comprising at least one in-line optical cable and a drop cable, the assembly including a duct suitable for housing the at least one in-line optical cable and an optical transition box for making an optical connection between the at least one in-line optical cable and the drop cable, wherein:

the duct has a window; and
the optical transition box has a base with two sidewalls, each of the two sidewalls having a first opening allowing the in-line optical cable to enter the base and to exit the base, the base being suitable for being partially inserted in the duct through the window in such a way that, when the base is partially inserted in the duct, the first opening is contained within the duct.

Preferably, the base comprises two dividing walls, each of the two dividing walls being adjacent to a respective one of the two sidewalls and being arranged perpendicularly to the respective one of the two sidewalls.

Profitably, the two dividing walls are arranged so as to form a divider having an opening at its center and dividing the base in a cable arrangement portion and a fiber arrangement portion adjacent to the cable arrangement portion.

Preferably, in the cable arrangement portion, each of the two sidewalls has a first weakening line defining a first removable portion, the first weakening line being such that, when the first removable portion is removed, the first opening is created.

Preferably, the base comprises a bottom and first fiber guiding protrusions extending substantially perpendicularly therefrom.

Profitably, each of the first fiber guiding protrusions has a curved cross section with a bending radius higher than or equal to 20 mm.

Preferably, the base comprises fiber winding protrusions having a lateral surface substantially cylindrical in at least a portion of a perimeter thereof.

Preferably, each of the fiber winding protrusions has a diameter equal to or higher than 40 mm.

Preferably, the optical transition box further comprises a splice tray connected to the base by means of at least one hinge.

Profitably, the splice tray is rotatable about the at least one hinge.

Preferably, the optical transition box further comprises a cover.

According to a second aspect, the present invention provides a method for installing an optical access network comprising at least one in-line optical cable laid down in a duct and a drop cable, wherein the method comprises:
a) providing a window in the duct;
b) providing an optical transition box having a base with a first opening allowing the in-line optical cable to enter the base and to exit the base;
c) inserting at least partially a base of the optical transition box within the duct through the window in such a way that the first opening is contained within the duct;
d) causing a portion of the in-line cable to exit and enter the base through the first opening;
e) introducing an end of the drop optical cable in the optical transition box; and
f) making an optical connection between at least one optical fiber of the in-line optical cable and at least one optical fiber of the drop optical cable within the optical transition box.

Preferably, step d) is preceded by a step of removing a first removable portion of a sidewall of the base, thus forming the first opening.

Profitably, step e) is preceded by a step of removing at least one second removable portion of a sidewall of the base, thus forming a second opening allowing to introduce the drop optical cable in the optical transition box.

BRIEF DESCRIPTION OF THE DRAWINGS

The present invention will become fully clear by reading the following detailed description, given by way of example and not of limitation, to be read by referring to the accompanying drawings, wherein:

FIGS. 4 to 12 show different steps of the method for installing an optical access network, according to an embodiment of the present invention.

DETAILED DESCRIPTION OF PREFERRED EMBODIMENTS OF THE INVENTION

As mentioned above, the assembly 100 for installing an optical access network according to an embodiment of the present invention comprises an optical transition box 1 and a duct 9.

Figure 1:
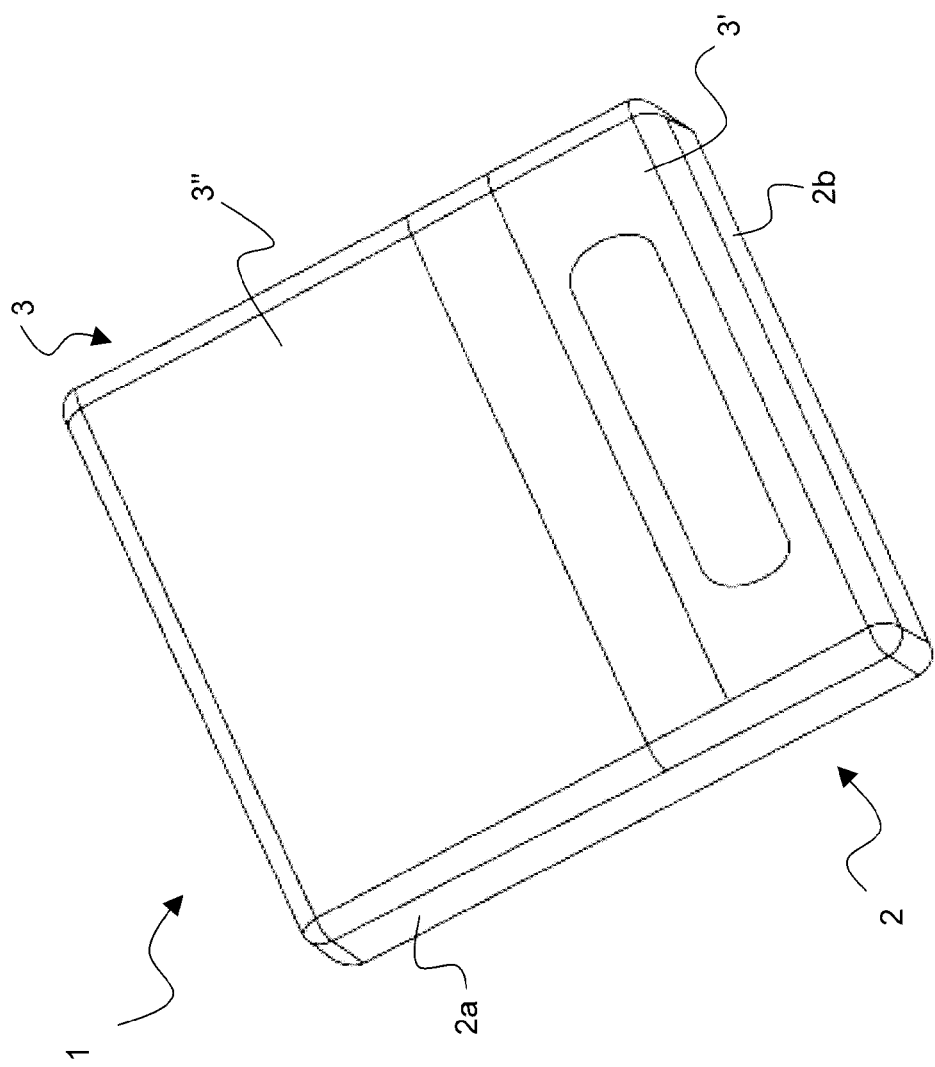
FIG. 1 is a perspective view of an optical transition box according to an embodiment of the present invention.
Figure 2:
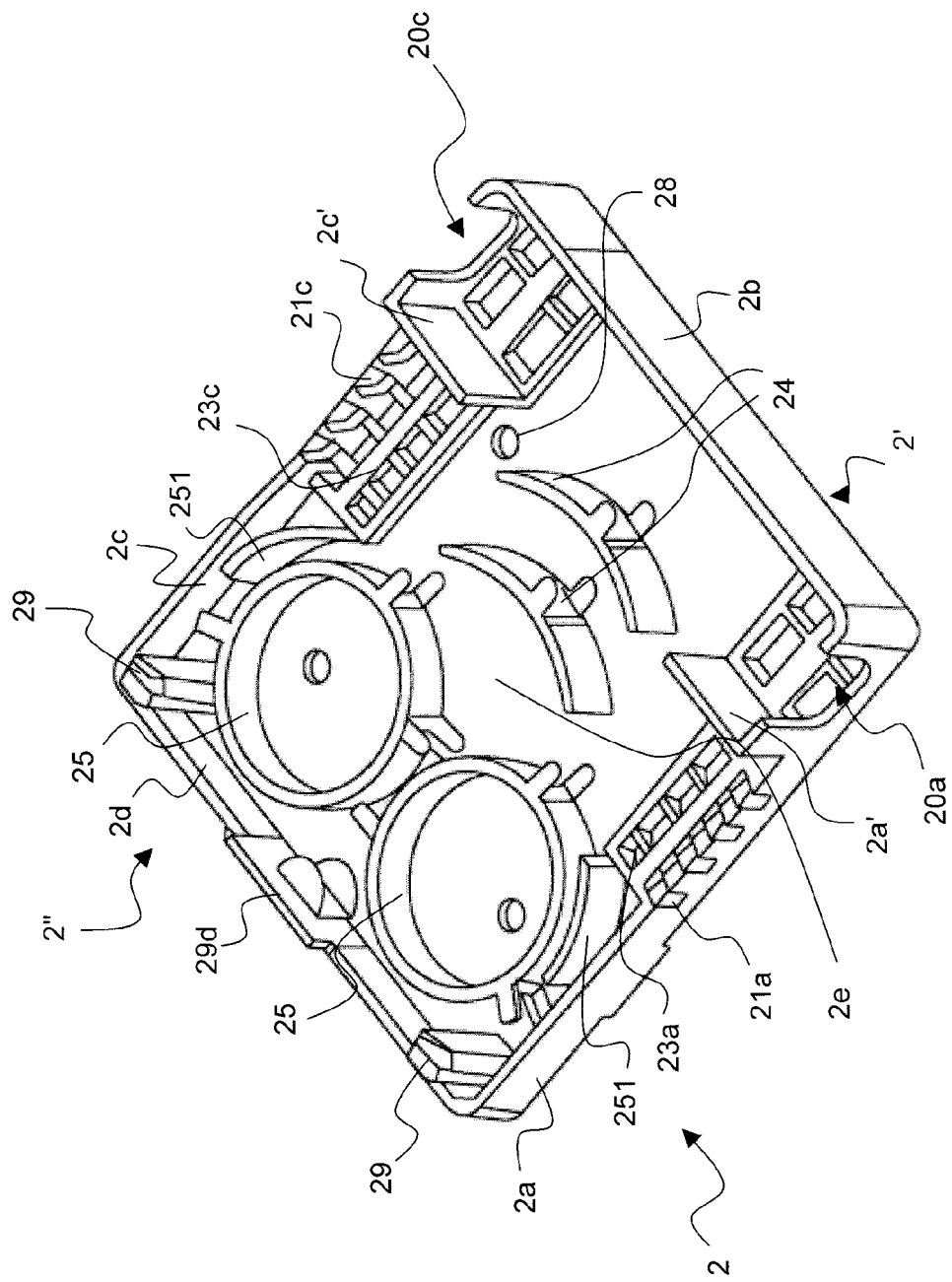
FIG. 2 is a perspective view of the base of the optical transition box of FIG. 1.
Figure 3:
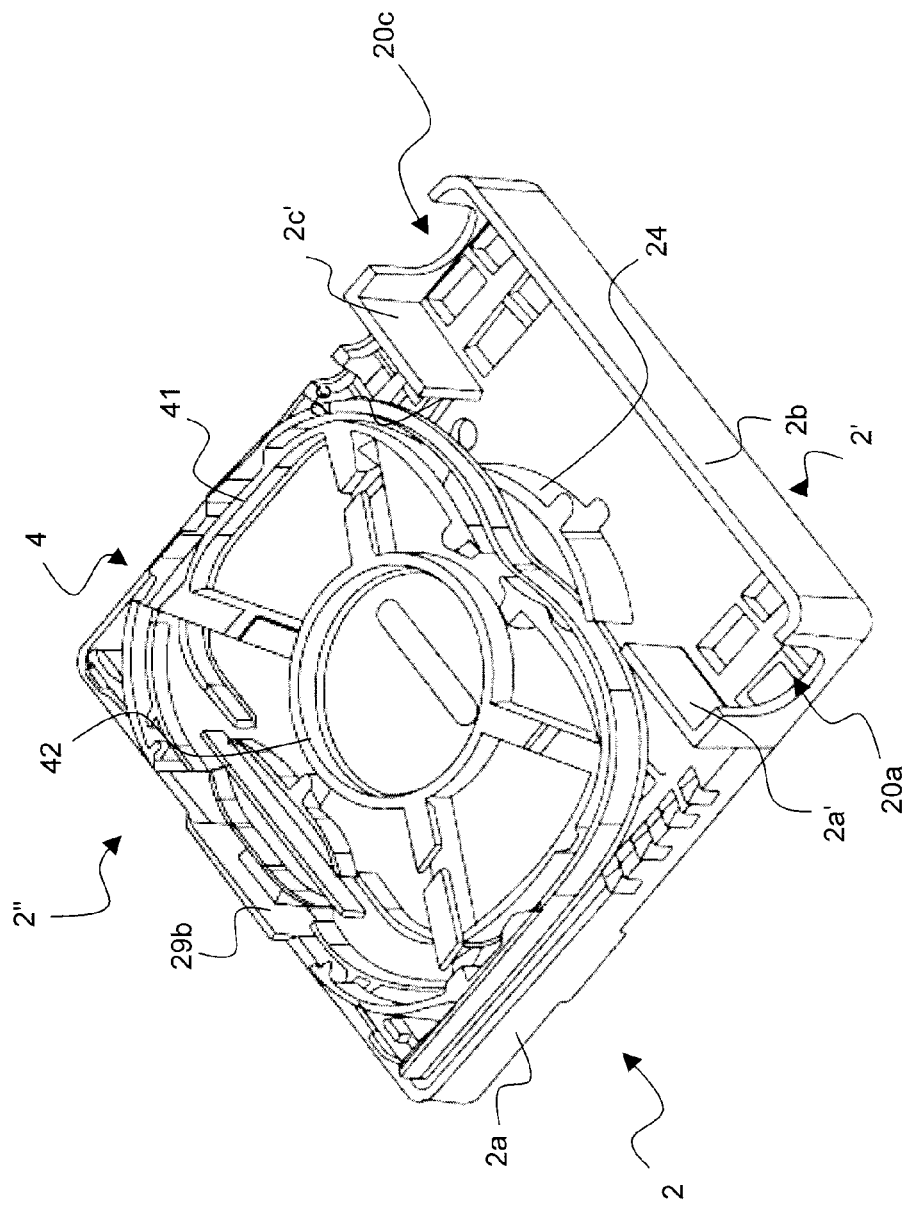
FIG. 3 is a perspective view of the base of the optical transition box of FIG. 1, when partially superimposed by the splice tray.

By referring to FIGS. 1 to 3, the optical transition box 1 according to an embodiment of the present invention will be described in detail. FIGS. 1 to 3 are not in scale.

The optical transition box 1 comprises a base 2, a cover 3 and a splice tray 4.

The base 2 comprises a bottom 2e and four sidewalls 2a, 2b, 2c, 2d. Preferably, the bottom 2e is substantially rectangular. Preferably, the sidewalls 2a, 2b, 2c, 2d are substantially perpendicular to the bottom 2e.

The base length may be comprised from about 200 mm to 150 mm, more preferably from about 150 mm to 120 mm.

The base width may be comprised from about 120 mm to 150 mm, more preferably from about 100 mm to 120 mm.

The base thickness may be comprised from about 50 mm to 10 mm, more preferably from about 30 mm to 20 mm.

Preferably, the base 2 further comprises two dividing walls 2a', 2c', each dividing wall 2a', 2c' being adjacent to a respective sidewall 2a, 2c and being arranged perpendicularly to it. Preferably, the dividing walls 2a', 2c' have a same distance from the sidewall 2b, so as to form a unique divider having an opening at its center and dividing the base 2 in two adjacent portions 2' and 2". In the following description, the first portion 2' will be termed "cable arrangement portion", whereas the second portion 2" will be termed "fiber arrangement portion".

Preferably, in their part corresponding to the cable arrangement portion 2', each of the sidewalls 2a, 2c has a first weakening line, respectively, defining a first removable portion of the sidewalls 2a, 2c, respectively. Preferably, the first weakening lines are placed in corresponding opposed positions, i.e. substantially at a same distance from the sidewall 2b. Preferably, each first weakening line is such that, when the corresponding first removable portion is removed (e.g. by pressing it with a finger tip or a tool), a first opening 20a, 20c is created which is suitable for housing an in-line cable. Preferably, the first weakening lines are U-shaped.

Preferably, in their part corresponding to the fiber arrangement portion 2", the sidewall 2a has second weakening lines, each defining second removable portions of the sidewall 2a. Preferably, each second weakening line is such that, when a corresponding second removable portion is removed (e.g. by pressing it with a finger tip or a tool), a second opening 21a is created which is suitable for housing a drop cable. Although in the Figures four second openings 21a are shown, this is merely exemplary since the sidewall 2a may have a different number of second openings 21a. Preferably, the second weakening lines are U-shaped. Preferably, also the sidewall 2c has second weakening lines which provide for corresponding removable portions. Since these second weakening lines are substantially equal to the second weakening lines of the sidewall 2a, a detailed description thereof will not be repeated.

Preferably, next to each second opening 21a of the sidewall 2a, the bottom 2e has drop cable fixing tabs 23a. Preferably, next to each second opening 21c of the sidewall 2c, the bottom 2e has drop cable fixing tabs 23c.

The bottom 2e is provided with a plurality of guiding elements 24, 25, 251 arranged within the fiber arrangement portion 2" of the base 2, whose shape and arrangement define optical fibers paths according to which the optical fibers extracted from the in-line cable and the drop cable(s) may be arranged within the fiber arrangement portion 2" of the base 2, as it will be described in detail herein after.

In particular, in a region between the dividing walls 2a', 2c', the bottom 2e has first fiber guiding protrusions 24 extending substantially perpendicularly to the bottom 2e. Each of the first fiber guiding protrusions 24 has a curved cross section with a bending radius which is preferably higher than or equal to 20 mm. The bottom 2e has also two fiber winding protrusions 25 which are generally indicated as "mandrels". Such a configuration is merely exemplary since the bottom 2e can have any number of fiber winding protrusions 25. Each fiber winding protrusions 25 has a lateral surface which is substantially cylindrical at least in a portion of its perimeter. Preferably, each fiber winding protrusion 25 has a diameter equal to or higher than 40 mm. Preferably, the bottom 2e has second fiber guiding protrusions 251 arranged around each of the fiber winding protrusions 25 and extending substantially perpendicularly to the bottom 2e. Each of the second fiber guiding protrusions 251 has a curved cross section such that each of the second fiber guiding protrusions 251 is substantially parallel to a portion of the lateral surface of one of the fiber winding protrusions 25.

Preferably, the bottom 2e has fixing holes 28 which are suitable for fixing the bottom 2e to a wall of a building by means of screws, bolts or the like.

The bottom 2e is further preferably provided with at least one hinge 29 (two hinges are shown in the Figures) for connecting the splice tray 4 to the base 2, as it will be described in detail herein after. The hinges are preferably arranged next to the sidewall 2d.

Preferably, the sidewall 2d of the base 2 has cover locking tabs 29d for allowing the cover 3 to be locked to the base 2.

Preferably, the base 2 is made of a thermoplastic material. More preferably, the base is made from ABS (Acrylonitrile butadiene styrene) polymers. In case a thermoplastic material is used, the drop fixing tabs 23a, 23c, the guiding elements 24, 25, 251, the hinges 29 and the cover locking tabs 29d can be integral with the base 2.

As mentioned above, the splice tray 4 is connected to the base 2 by means of hinges 29. In particular, the splice tray 4 is rotatable about the hinges 29 between a first position (which is shown in FIG. 3), wherein the splice tray 4 is in a closed configuration and it substantially covers the fiber arrangement portion 2" of the base 2, and a second position (which is not shown in the drawings), wherein the splice tray 4 is in an open configuration for allowing easy access to the base 2.

Preferably, the splice tray 4 is provided with a plurality of fiber guiding channels 41 and a central mandrel 42. Preferably, the fiber guiding channels 41 have straight portions and curved portions, with each curved portion having a bending radius preferably higher that or equal to 20 mm. Preferably, the central mandrel 42 has a diameter equal to or higher than 40 mm. Preferably, the splice tray 4 is made of a thermoplastic material. More preferably, the splice tray 4 is made from ABS (Acrylonitrile butadiene styrene) polymers.

The cover 3 of the optical transition box 1 preferably comprises a first cover portion 3' and a second cover portion 3", as shown in FIG. 1. The first cover portion 3' is suitable for being locked to the base 2' by means of a further tab, which is not shown in the drawings, thus covering the cable arrangement portion 2' of the base 2. On the other hand, the second cover portion 3" is suitable for being locked to the base 2 by means of the cover locking tabs 29d, thus covering the fiber arrangement portion 2" of the base 2.

Herein after, by referring also to FIGS. 4 to 12, a possible installation of an optical access network by using the optical transition box 1 will be described in detail.

It is assumed that the optical access network to be installed comprises three in-line cables laid down in a in-line cable duct. The in-line cable duct, which is indicated by the reference number 9 in FIGS. 4 to 12, is shown to have a square section. However, the in-line cable duct 9 can have a cross-section of any shape. The in-line cable duct 9 is provided with a duct cover 93.

The in-line cable duct 9 is assumed to be fixed to a building wall (not shown in the drawings) along its sidewalls 91. The in-line cable duct 9 of FIGS. 4 to 12 is shown to be horizontally arranged. This arrangement has been used only for improving clarity of the drawings. However, in the practice, the in-line cable duct is vertically arranged within the building.

It is assumed that the installation of the access network requires connecting one of the in-line cables, which is indicated as 7 in FIGS. 4 to 12, to four drop cables. This operation is started by exposing the in-line cable 7 and the other in-line cables laying within the duct 9, as shown in FIG. 5. Possibly, this is done by removing the cover 93 of the in-line cable duct 9.

Then, a window 9a is made at a sidewall 92 of the in-line cable duct 9. The sidewall 92, on which the window 9a is made, is adjacent to the sidewall 91 that is coupled to the building wall. The window 9a is large enough to allow the base 2 of the optical transition box 1 to be partially inserted within the in-line cable duct 9 through it. In particular, the length of the window 9a is preferably equal to or slightly higher than the base length. Therefore, preferably, the length of the window 9a is comprised from about 200 mm to 150 mm, more preferably from about 150 mm to 120 mm.

Then, the first removable portions of the respective sidewalls 2a, 2c are removed (e.g. by pressing them with a finger tip or a tool) so that first openings 20a, 20c are formed in the sidewalls 2a, 2c, respectively, for receiving the in-line cable 7 entering into and exiting from the optical transition box 1.

Then, at least one of the second removable portions of the sidewall 2a and/or at least one of the second removable portions of the sidewall 2c are removed. In this way, at least one second opening 21a is formed in the sidewall 2a and/or at least one second opening 21c is formed in the sidewall 2c for receiving corresponding drop cables 8.

The operations of forming the first and second openings may be performed before making the window 9a.

For simplicity, it is assumed that the four drop cables to be connected to the in-line cable 7 are provided to reach the optical transition box 1 from an area facing the sidewall 2a. Therefore, only the four second removable portions provided at the sidewall 2a are removed, thus forming four second openings 21a which are suitable for receiving the drop cables 8 at the sidewall 2a.

According to the present invention, the base 2 of the optical transition box 1 is coupled to the in-line cable tray 9 so that the cable arrangement portion 2' of the base 2 enters the in-line cable duct 9 through the window 9a, while the fiber arrangement portion 2" of the base protrudes outside the duct 9. The operator may perform this operation by adjusting the position of the base 2 relative to the duct 9 until the dividing walls 2a', 2c' of the base 2 are substantially aligned to the sidewall 92 of the in-line cable duct 9, as shown in FIG. 6.

The base 2 is then fixed to the building wall, e.g. by means of screws or the like.

Then, a portion of the in-line cable 7 is arranged within the cable arrangement portion 2' of the base 2. In particular, the in-line cable 7 enters the base 2 through the first opening 20a of the sidewall 2a and exits the base 2 through the first opening 20c of the sidewall 2c, as shown in FIG. 7.

The outer sheath of the in-line cable 7 contained within the base 2 is peeled off and at least one in-line optical fiber is extracted from the in-line cable 7. Since it has been assumed that four different drop cables 8 are to be connected to the in-line cable 7, four in-line optical fibers are preferably extracted from the in-line cable 7, each in-line optical fiber being intended for connection with a respective drop cable 8.

The in-line optical fibers are then arranged within the bottom 2e according to respective paths selected among the paths defined by the guiding elements 24, 25, 251. In particular, the in-line optical fibers are arranged within the first fiber guiding protrusions 24 and then they are wound around the fiber winding protrusions 25. The second fiber winding protrusions 251 help keeping the wound fibers in the correct and safe position.

Then, the splice tray 4 is connected to the base 2 by means of the hinges 29, thus substantially covering the fiber arrangement portion 2" of the base 2, as shown in FIG. 8. The free ends of the in-line optical fibers are brought to the splice tray 4 where they will be spliced, as it will be described in detail herein after.

Then, preferably, the first cover portion 3' is fitted onto the cable arrangement portion 2" of the base 2 and pressed for snap-on locking it, as shown in FIG. 9.

Figure 10:
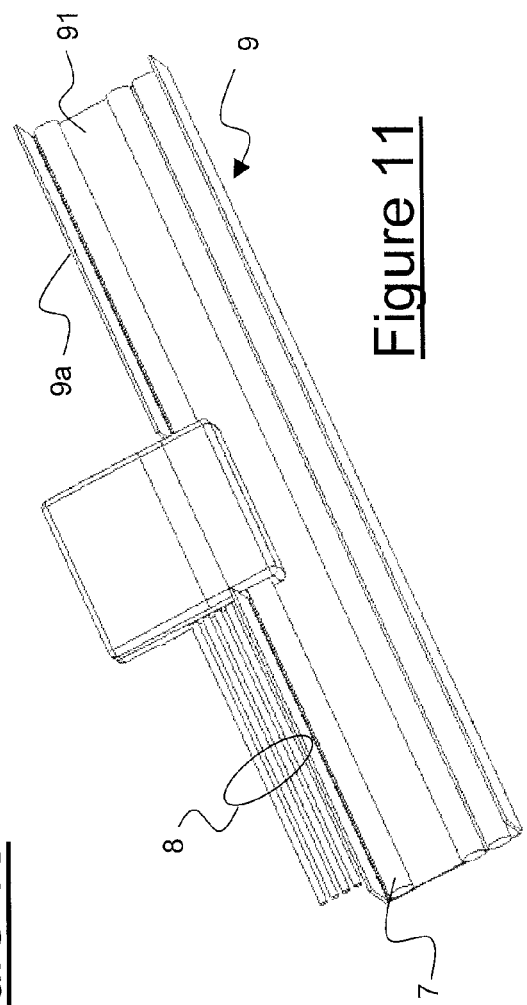

Each drop cable 8 has a first end which is generally connected to a respective termination box (not shown in the Figures) and a second end which is inserted into the base 2 (in particular, into the fiber arrangement portion 2" of the base 2), for instance through the second openings 21a of the sidewall 2a of the base 2, as shown in FIG. 10. Preferably, the drop cables 8 are fixed to the base 2 by means of drop cable fixing tabs 23a which prevent any axial movement of the drop cables 8. The outer sheath of the drop cables within the base 2 is removed, so that at least one drop optical fiber for each drop cable is exposed.

Then, each in-line optical fiber is connected to a respective drop optical fiber, e.g. by means of fusion splicing or by means of a mechanical joint. The spliced fibers are then arranged in the fiber guiding channels 41 of the splice tray 4 and, if necessary, they are wound about the central mandrel 42.

Figure 11:
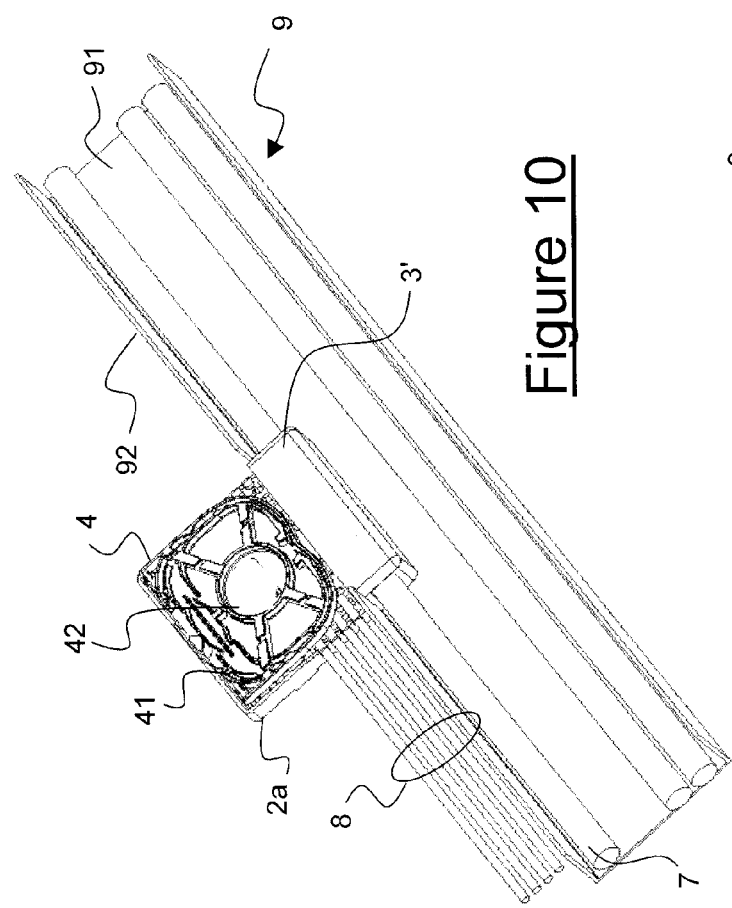

Then, preferably, the second cover portion 3" is fitted onto the fiber arrangement portion 2" of the base 2 and pressed for snap-on locking it, as shown in FIG. 11.

Figure 12:
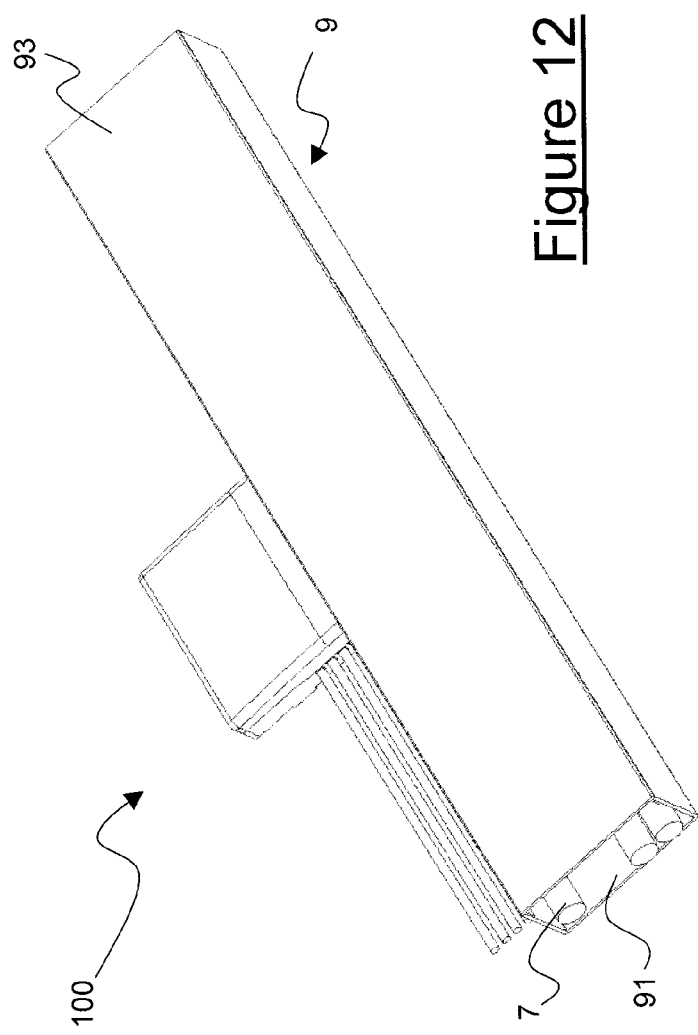

Finally, the duct cover 93 is replaced and the in-line cable duct 9 is suitably closed, as shown in FIG. 12.

The assembly 100 for installing an optical access network according to the embodiments of the present invention has a plurality of advantages.

First of all, advantageously, the operation of installing the optical transition box 1 when the duct 9 is already fixed to the wall is simpler than according to the above known solution, since it does not require to move the duct 9 away from the wall, but it only requires to open the window 9a on the sidewall 92 of the duct 9, which is a very simple operation.

Moreover, the optical transition box 1 of the assembly 100 has a much reduced thickness. Indeed, while the known optical transition boxes should be thicker than the in-line cable duct 9 (since the latter has to be contained within the optical transition box), the optical transition box 1 of the assembly according to the present invention is less thin than the in-line cable duct 9, since it has to be partially contained within the duct 9. Besides, also the width of the optical transition box 1 is reduced. This advantageously results in an optical installation of reduced size and aesthetically effective.

The invention claimed is:

1. An assembly for installing an optical access network comprising at least one in-line optical cable and a drop cable, comprising a duct capable of housing the at least one in-line optical cable and an optical transition box for making an optical connection between the at least one in-line optical cable and the drop cable, wherein:
said duct has a window; and
said optical transition box has a base with two sidewalls, each of said two sidewalls having a first opening allowing the in-line optical cable to enter said base and to exit said base, said base capable of being partially inserted in said duct through said window in such a way that, when said base is partially inserted in said duct, said first opening is within said duct.

2. The assembly according to claim 1, wherein said base comprises two dividing walls, each of said two dividing walls being adjacent to a respective one of said two sidewalls and arranged perpendicularly to said respective one of said two sidewalls.

3. The assembly according to claim 2, wherein said two dividing walls are arranged so as to form a divider having an opening at a center thereof and dividing said base in a cable arrangement portion and a fiber arrangement portion adjacent said cable arrangement portion.

4. The assembly according to claim 1 wherein, in said cable arrangement portion, each of said two sidewalls has a first weakening line defining a first removable portion, said first weakening line being such that, when said first removable portion is removed, said first opening is created.

5. The assembly according to claim 1, wherein said base comprises a bottom and first fiber guiding protrusions extending substantially perpendicularly therefrom.

6. The assembly according to claim 5, wherein each of said first fiber guiding protrusions has a curved cross section with a bending radius higher than or equal to 20 mm.

7. The assembly according to claim 1, wherein said base comprises fiber winding protrusions having a lateral surface substantially cylindrical in at least a portion of a perimeter thereof.

8. The assembly according to claim 7, wherein each of said fiber winding protrusions has a diameter equal to or higher than 40 mm.

9. The assembly according to claim 1, wherein said optical transition box further comprises a splice tray connected to said base by means of at least one hinge.

10. The assembly according to claim 9, wherein said splice tray is rotatable about said at least one hinge.

11. The assembly according to claim 1, wherein said optical transition box further comprises a cover.

12. A method for installing an optical access network comprising at least one in-line optical cable laid down in a duct and a drop cable, comprising:
a) providing a window in the duct;
b) providing an optical transition box having a base with a first opening allowing the in-line optical cable to enter said base and to exit said base;
c) inserting at least partially a base of said optical transition box within said duct through said window in such a way that said first opening is contained within said duct;
d) causing a portion of said in-line cable to exit and enter said base through said first opening;
e) introducing an end of said drop optical cable in said optical transition box; and
f) making an optical connection between at least one optical fiber of said in-line optical cable and at least one optical fiber of said drop optical cable within said optical transition box.

13. The method according to claim 12, wherein causing a portion of said in-line cable to exit and enter said base is preceded by removing a first removable portion of a sidewall of said base, thereby forming said first opening.

14. The method according to claim 12, wherein introducing an end of said drop optical cable in said optical transition box, is preceded by removing at least one second removable portion of a sidewall of said base, thereby forming a second opening allowing introducing said drop optical cable in said optical transition box.

* * * * *